(12) United States Patent
Lee et al.

(10) Patent No.: US 7,489,354 B2
(45) Date of Patent: Feb. 10, 2009

(54) CMOS ACTIVE PIXEL WITH HARD AND SOFT RESET

(75) Inventors: Hae-Seung Lee, Bedford, MA (US);
Keith Glen Fife, Stanford, CA (US);
Lane G. Brooks, Watertown, MA (US);
Jungwook Yang, Waban, MA (US)

(73) Assignee: Cypress Semiconductor Corporation, San Jose, CA (US)

( * ) Notice: Subject to any disclaimer, the term of this patent is extended or adjusted under 35 U.S.C. 154(b) by 445 days.

(21) Appl. No.: 10/752,112

(22) Filed: Jan. 6, 2004

(65) Prior Publication Data

US 2005/0083422 A1    Apr. 21, 2005

Related U.S. Application Data

(60) Provisional application No. 60/438,699, filed on Jan. 8, 2003.

(51) Int. Cl.
*H04N 5/335* (2006.01)
(52) U.S. Cl. .................................... 348/308
(58) Field of Classification Search ........... 348/308, 348/310, 313, 241; 250/280.1, 214; 257/291, 257/292
See application file for complete search history.

(56) References Cited

U.S. PATENT DOCUMENTS 6,320,616 B1   11/2001  Sauer
6,493,030 B1 *  12/2002  Kozlowski et al. ........ 348/310
6,519,371 B1 *  2/2003  Pain et al. ................ 382/288
6,532,040 B1    3/2003  Kozlowski et al.
6,566,697 B1 *  5/2003  Fox et al. ................. 257/292

(Continued)

FOREIGN PATENT DOCUMENTS

WO    WO 2004/064025 A2    7/2004

OTHER PUBLICATIONS

Decker et al., "A 256×256 CMOS Imaging Array with Wide Dynamic Range Pixels and Column-Parallel Digital Output", IEEE Journal of Solid-State Circuits, Dec. 1998, vol. 33, No. 12, pp. 2081-2091.

(Continued)

*Primary Examiner*—Lin Ye
*Assistant Examiner*—Amy Hsu
(74) *Attorney, Agent, or Firm*—Blakely, Sokoloff, Taylor & Zafman LLP

(57) ABSTRACT

A circuit for a pixel site in an imaging array includes a light-detecting element to convert incident light to a photocurrent and a reset transistor, operatively connected to the light-detecting element, to reset a voltage associated with the light-detecting element. The reset transistor hard resets the voltage associated with the light-detecting element and soft resets the voltage associated with the light-detecting element after the generation of the hard reset of the voltage associated with the light-detecting element. A pixel voltage of a column or row line is also measured by hard resetting the column or row line voltage to a first predetermined voltage; soft resetting the column or row line voltage to a first pixel voltage; hard resetting the column or row line voltage to a second predetermined voltage; soft resetting the column or row line voltage to a second pixel voltage; and determining a difference between the first and second pixel voltages, the difference being the measured pixel voltage.

21 Claims, 6 Drawing Sheets

U.S. PATENT DOCUMENTS

| | | | |
|---|---|---|---|
| 6,727,946 B1 * | 4/2004 | Zhao et al. | 348/308 |
| 6,777,660 B1 | 8/2004 | Lee | |
| 6,847,070 B2 * | 1/2005 | Fox | 257/291 |
| 6,911,640 B1 * | 6/2005 | Bencuya et al. | 250/208.1 |
| 6,958,776 B2 * | 10/2005 | Mendis et al. | 348/308 |
| 7,045,753 B1 * | 5/2006 | Fox | 250/208.1 |
| 2003/0141497 A1 * | 7/2003 | Watanabe | 257/21 |
| 2004/0174449 A1 * | 9/2004 | Lee et al. | 348/308 |
| 2004/0174450 A1 | 9/2004 | Lee et al. | |
| 2004/0201550 A1 * | 10/2004 | Nakamura et al. | 345/55 |
| 2005/0018060 A1 | 1/2005 | Takayanagi | |

OTHER PUBLICATIONS

Kozlowski et al., "A Progressive 1920×1080 Imaging System-on-Chip for HDTV Cameras", IEEE International Solid-State Circuits Conference, Feb. 8, 2005, Session 19, Digest of Technical Papers, pp. 358-359.

"Ultra-Pocket® 5 Kit. Rapid Development Kit for 3.0-Megapixel Credit Card Cameras with Color TFT LCD Display", SMal Camera, Aug. 25, 2005, pp. 1-3, Technologies, http:www.smalcamera.com/up51cd.html.

"International Search Report", International Searching Authority, PCT/US2004/000153, Jul. 29, 2004, 3 pages.

"Written Opinion of the International Searching Authority", International Searching Authority, PCT/US2004/000153, Jul. 29, 2004, 8 pages.

PCT International Preliminary Report on Patentability (Chapter 1 of the Patent Cooperation Treaty), PCT/US2004/000153 filed Jan. 6, 2004, mailed Jul. 21, 2005.

U.S. Appl. No. 10/752,197, Office Action dated May 11, 2007, 17 pages.

U.S. Appl. No. 10/752,131, Office Action dated May 11, 2007, 18 pages.

U.S. Appl. No. 10/752,197, Office Action dated Nov. 19, 2007, 9 pages.

U.S. Appl. No. 10/752,131, Office Action dated Nov. 16, 2007, 13 pages.

U.S. Appl. No. 10/752,197, Notice of Allowance dated Jun. 13, 2008, 13 pages.

U.S. Appl. No. 10/752,131, Notice of Allowance dated Jun. 30, 2008, 8 pages.

* cited by examiner

CMOS ACTIVE PIXEL WITH HARD AND SOFT RESET

PRIORITY INFORMATION

This application claims priority under 35 U.S.C. §119(e) from U.S. Provisional Patent Application, Ser. No. 60/438, 699, filed on Jan. 8, 2003. The entire content of U.S. Provisional Patent Application, Ser. No. 60/438,699, is hereby incorporated by reference.

FIELD OF THE PRESENT INVENTION

The present invention relates to imaging devices and, in particular, to complementary metal-oxide semiconductor (CMOS) image sensors using variable-type reset pulses to substantially eliminate image lag and significantly reduce reset noise.

BACKGROUND OF THE PRESENT INVENTION

Conventionally, a CMOS imager pixel includes a phototransistor or photodiode operating as a light-detecting element. In operation, e.g., the pixel photodiode is first reset to a reset voltage that places an electronic charge across the capacitance associated with the photodiode. Electronic charge produced by the photodiode when exposed to illumination then causes charge of the photodiode capacitance to dissipate in proportion to the incident illumination intensity. At the end of an exposure period, the change in photodiode capacitance charge is detected and the photodiode is reset again. The amount of light detected by the photodiode is computed as the difference between the reset voltage and the voltage corresponding to the final capacitance charge.

Referring to FIG. 1, the operation of a prior art pixel 10 is described. FIG. 1 shows the schematic diagram of a standard active pixel. A photodiode 11 produces a current proportional to the incident light intensity. The resulting photo current is integrated on a charge-sensing capacitor 13. The charge-sensing capacitor 13 is typically reverse-biased PN junction capacitance associated with the photodiode 11 and other parasitic capacitance.

A MOS transistor 15 operates as a source-follower that buffers the voltage on the capacitor 13 nondestructively to a column line 23. A row select MOS switch 17 activates the source-follower transistor 15 when the particular row is selected by connecting the column current source 25 to the source of the source-follower transistor 15.

There are two primary ways to reset an active pixel, using a "soft" reset or using a "hard" reset. When using a "soft" reset, the voltage at the gate 21 of the reset transistor 19 is raised to a voltage that is no higher than the threshold voltage of the reset transistor, $V_{RTTH}$, above the drain voltage of the reset transistor, typically at $V_{DD}$. Generally, the voltage at the gate 19 is raised to the same potential as its drain voltage, $V_{DD}$.

As the capacitor 13 is charged by the current from the reset transistor 19, the voltage at the sense node 27 increases, decreasing the gate-to-source voltage of the reset transistor 19. This in turn decreases the current from the reset transistor 19, and the rate of voltage rise at the sense node 27 decreases. As the gate-to-source voltage of the reset transistor 19 approaches its threshold voltage $V_{RTTH}$ of reset transistor 19, the current through the reset transistor 19 becomes extremely low, and the voltage at the sense node 27 rises very slowly. The voltage at the sense node 27 approaches approximately $(V_{DD}-V_{RTTH})$ but it never reaches a steady state because the rate of the voltage change becomes ever so slower. Then, the voltage at the gate 21 is lowered typically to ground, completing the reset process. At this time, the sense node 27 is reset to approximately $(V_{DD}-V_{RTTH})$.

In hard reset, the gate voltage of the reset transistor 19 is raised to a voltage greater than the drain voltage of the reset transistor by at least $V_{RTTH}$. Typically, the gate voltage of reset transistor 19 is raised to $V_{DD}$ while the drain voltage of the reset transistor is maintained at a reset voltage $V_{RESET}$ that is lower than $(V_{DD}-V_{RTTH})$. This drives the reset transistor 19 into the triode region, thereby causing it to behave like a resistor.

The reset transistor 19 and the sense capacitor 13 behave like an RC circuit, and the sense node voltage approaches $V_{RESET}$ with an RC time constant, $\tau=R_{ON}C$, where $R_{ON}$ is the ON resistance of the reset transistor 19 and C is the value of the sense capacitor 13. Since the sense capacitance is on the order of a few femtofarads and the ON resistance is a few tens of kohms, the time constant is on the order of only a nanosecond.

Thus, the sense node typically reaches the full steady-state value $V_{RESET}$ within a few nanoseconds, which is much shorter than typical reset period of many microseconds. Then, the voltage at the gate 21 is lowered typically to ground, completing the reset process. At this time, the sense node 27 is reset to approximately $V_{RESET}$.

It is well known that by using a "soft" reset, one can realize a lower reset noise, by a factor of $\sqrt{2}$, compared to when using a "hard" reset. Thus, it is desirable from signal-to-noise ratio and sensitivity point of view to use a "soft" reset. However, since the sense node never reaches a steady state value, the voltage of the sense node is actually reset to different voltages depending on the initial condition on the sense node. This leads to substantial image lag. Even with popular double sampling method, a significant amount of image lag remains, which gives a blurry picture of moving objects.

Furthermore, it is well known that by using a "hard" reset, one can substantially eliminate the image lag because the voltage to which the pixel is reset is always $V_{RESET}$. However, the disadvantage of using a "hard" reset is that higher reset noise is realized.

Therefore it is desirable to provide a imaging reset methodology and/or circuitry for an imager that provide a resetting capability, wherein reset noise is significantly reduced, image lag is substantially eliminated, a desirable signal-to-noise ratio is realized, and/or the imager realizes a desirable sensitivity.

SUMMARY OF THE PRESENT INVENTION

A first aspect of the present invention is a circuit for a pixel site in an imaging array. The circuit includes a light-detecting element to convert incident light to an electrical signal; a reset transistor, operatively connected to the light-detecting element, to reset a voltage associated with the light-detecting element; and a reset voltage generator, operatively connected to a non-gate terminal of the reset transistor, to generate a reset voltage. The reset voltage generator generates a first voltage and generates a second voltage after generating the first voltage.

A second aspect of the present invention is a circuit for a pixel site in an imaging array. The circuit includes a light-detecting element to convert incident light to an electrical signal; a reset transistor, operatively connected to the light-detecting element, to reset a voltage associated with the light-detecting element; and a reset voltage generator, operatively connected to a non-gate terminal of the reset transistor, to generate signals. The reset voltage generator generates a first signal to cause the reset transistor to hard reset the voltage associated with the light-detecting element. The reset voltage generator generates a second signal after generating the first signal, the generation of the second signal causing the reset transistor to soft reset the voltage associated with the light-detecting element.

A third aspect of the present invention is an imager. The imager includes a two-dimensional array of light-detecting elements; a plurality of reset transistors, each reset transistor operatively connected to a corresponding light-detecting element, to reset a voltage associated with the light-detecting element; and a reset voltage generator, operatively connected to non-gate terminals of the reset transistors, to generate signals. The reset voltage generator generates a first signal to cause each reset transistor to hard reset the voltage associated with the corresponding light-detecting element. The reset voltage generator generates a second signal after generating the first signal, the generation of the second signal causing each reset transistor to soft reset the voltage associated with the corresponding light-detecting element.

A fourth aspect of the present invention is an imager. The imager includes a two-dimensional array of light-detecting elements; a plurality of reset transistors, each reset transistor operatively connected to a corresponding light-detecting element, to reset a voltage associated with the light-detecting element; and a reset voltage generator, operatively connected to non-gate terminals of the reset transistors, to generate signals. The reset voltage generator generates a first voltage and a second voltage after generating the first voltage.

A fifth aspect of the present invention is a method of resetting a light-detecting element associated with a pixel site in an imaging array. The method generates a first voltage to reset a voltage associated with the light-detecting element and generates a second voltage after generating the first voltage to reset the voltage associated with the light-detecting element, the second voltage being different in value from the first voltage.

A sixth aspect of the present invention is a method of resetting a light-detecting element associated with a pixel site in an imaging array. The method generates a hard reset of a voltage associated with the light-detecting element to reset the voltage associated with the light-detecting element and generates a soft reset of the voltage associated with the light-detecting element, after generating the hard reset, to reset the voltage associated with the light-detecting element.

A seventh aspect of the present invention is a circuit for a pixel site in an imaging array. The circuit includes a pixel to convert incident light to an electrical signal; a column line to read out a voltage from the pixel; a column line transistor, operatively connected between one end of the column line and a predetermined voltage, to hard reset a voltage associated with the column line; and a reset voltage generator, operatively connected to the column line transistor, to generate column line reset pulses. The reset voltage generator generates a first reset pulse at a beginning of an integration period of the pixel. The reset voltage generator generates a second reset pulse after generating the first reset pulse, the generation of the second reset pulse being at an end of the integration period of the pixel.

Another aspect of the present invention is a method for measuring a pixel voltage using a column line. The method hard resets the column line voltage to a first predetermined voltage; soft resets the column line voltage to a first pixel voltage; hard resets the column line voltage to a second predetermined voltage; soft resets the column line voltage to a second pixel voltage; and determines a difference between the first and second pixel voltages, the difference being the measured pixel voltage.

A further aspect of the present invention is a method for measuring a pixel voltage using a column line, the column line including a column line transistor. The method turns ON the column line transistor to bring the column line to a first predetermined voltage level; turns ON a row select transistor associated with the pixel and turning OFF column line transistor to bring the column line voltage up to a pixel voltage level; captures a first voltage value on the column line; turns ON the column line transistor to bring the column line to a second predetermined voltage level; turns ON a row select transistor associated with the pixel and turning OFF column line transistor to bring the column line voltage up to a pixel voltage level; captures a second voltage value on the column line; and determines a difference between the first and second captured voltage values, the difference being the measured pixel voltage.

Another aspect of the present invention is a circuit for a pixel site in an imaging array. The circuit includes a pixel to convert incident light to an electrical signal; a row line to read out a voltage from the pixel; a row line transistor, operatively connected between one end of the row line and a predetermined voltage, to reset a voltage associated with the row line; and a reset voltage generator, operatively connected to the row line transistor, to generate reset pulses. The reset voltage generator generates a first reset pulse at a beginning of an integration period of the pixel. The reset voltage generator generates a second reset pulse after generating the first reset pulse, the generation of the second reset pulse being at an end of the integration period of the pixel.

A further aspect of the present invention is a method for measuring a pixel voltage using a row line. The method hard resets the row line voltage to a first predetermined voltage; soft resets the row line voltage to a first pixel voltage; hard resets the row line voltage to a second predetermined voltage; soft resets the row line voltage to a second pixel voltage; and determines a difference between the first and second pixel voltages, the difference being the measured pixel voltage.

Another aspect of the present invention is a method for measuring a pixel voltage using a row line, the row line including a row line transistor. The method turns ON the row line transistor to bring the row line to a first predetermined voltage level; turns ON a column select transistor associated with the pixel and turning OFF row line transistor to bring the row line voltage up to a pixel voltage level; captures a first voltage value on the row line; turns ON the row line transistor to bring the row line to a second predetermined voltage level; turns ON a column select transistor associated with the pixel and turning OFF row line transistor to bring the row line voltage up to a pixel voltage level; captures a second voltage value on the row line; and determines a difference between the first and second captured voltage values, the difference being the measured pixel voltage.

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention, wherein.

DETAIL DESCRIPTION OF THE PRESENT INVENTION

Figure 1:
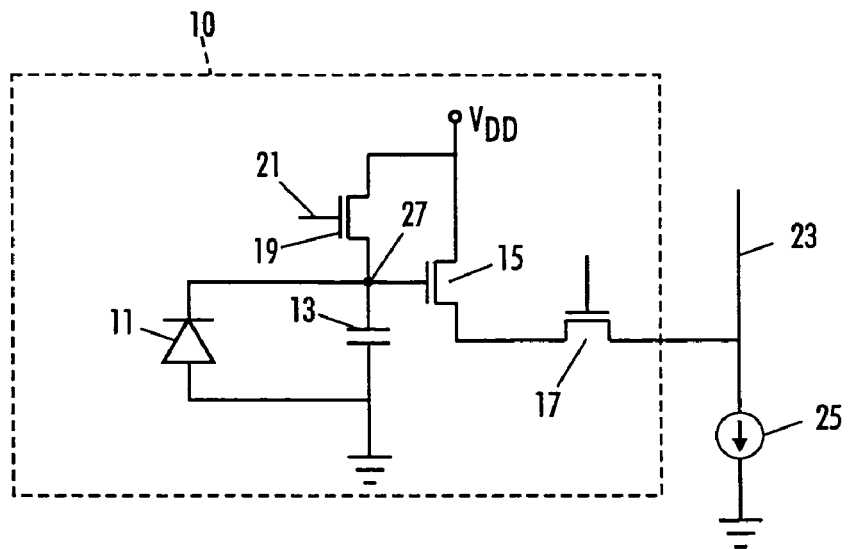
FIG. 1 is a schematic circuit diagram of a prior art pixel.

The present invention will be described in connection with preferred embodiments; however, it will be understood that there is no intent to limit the present invention to the embodiments described herein. On the contrary, the intent is to cover all alternatives, modifications, and equivalents as may be included within the spirit and scope of the present invention, as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions have been purposely drawn disproportionately so that the features and concepts of the present invention could be properly illustrated.

Figure 2:
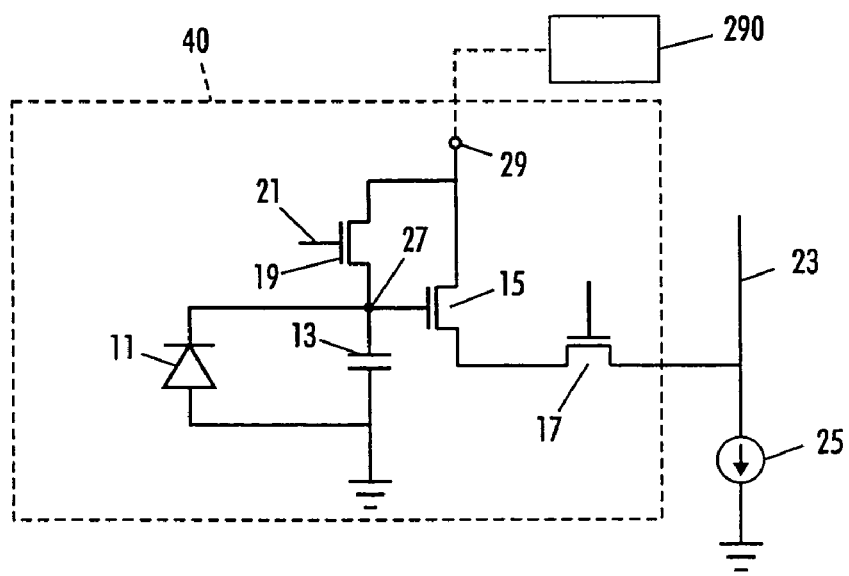
FIG. 2 is a schematic diagram of one embodiment of a pixel circuit in accordance with the concepts of present invention.

Referring to FIG. 2, the operation of a CMOS active pixel 40 in accordance with the concepts of the present invention will be described. The illustrated pixel configuration of FIG. 2 employs a photodiode 11, but it is to be recognized that in general, the pixel can include other light collecting configurations, embodied as, e.g., a phototransistor, a photogate, or other selected configuration. In the illustrated example, a photodiode 11 of the pixel 40 produces a current of photogenerated electrical charge in response to illumination intensity incident on the photodiode. The resulting photocurrent causes charge associated with a capacitor 13 of the photodiode 11 to dissipate in proportion to the incident illumination intensity. As an electrical element, the photodiode capacitor 13 physically is provided as the parasitic reverse-biased P-N junction capacitance associated with the photodiode itself and other parasitic capacitance.

A MOS transistor 15 operates as a source-follower that buffers the voltage of the photodiode capacitor 13, at a sense node 27 of the capacitor, nondestructively to a column line 23 for read out of the pixel voltage. A row select MOS switch 17 activates the source-follower transistor 15 when the particular row of an imager in which the pixel resides is selected, thereby enabling the photodiode capacitance voltage measurement.

When the row select MOS switch 17 of the row is turned ON, and a current source 25 is connected to the source of the MOS transistor 15, the MOS transistor 15 and the current source 25 operate as a source-follower configuration to buffer the voltage of the photodiode capacitor sense node 27 to the column line 23 for determining the capacitor voltage at the end of an exposure period, thereby measuring the electronic charge held by the pixel. The reset node 29, typically fixed at $V_{DD}$ in prior art imagers with soft reset, or $V_{RESET}$ in prior art imagers with hard reset, is operatively connected to a reset voltage generator 290, which alternatively generates a voltage between $V_{DD}$ and $V_{RESET}$, as will be described in more detail below.

The operation of the active pixel in accordance with the present invention is similar to that of the prior art pixel, but is different in the reset process. Prior to an integration period, the pixel photodiode is first 'reset'. When the pixel is reset, the voltage at the gate 21 of the reset transistor 19 is raised to a 'high' value that is typically $V_{DD}$. Also, the voltage generated by reset voltage generator 290 and applied at reset node 29 is set first at the reset voltage $V_{RESET}$, typically at least $V_{TH19}$ below the voltage at the gate 21 of the transistor 19, where $V_{TH19}$ is the threshold voltage of the reset transistor 19.

Setting the voltage, through the reset voltage generator 290, at reset node 29 to the reset voltage $V_{RESET}$ drives the reset transistor 19 into the triode region of operation for the hard reset of the sense node 27 to $V_{RESET}$. The hard reset erases any possible image lag effect. However, it introduces significant reset noise into the circuit.

In order to overcome the introduced reset noise and the smaller pixel voltage range associated with a hard reset, the pixel is then soft reset, immediately after the hard reset. For the soft reset, the voltage generated by reset voltage generator 290 and applied at reset node 29 is raised to a higher voltage, typically $V_{DD}$, and the pixel is allowed to soft reset to approximately $V_{DD}-V_{TH19}$.

The voltage at the gate of the reset transistor 19 returns to a low level, typically ground, at the end of the reset period. The voltage waveform at the gate of reset transistor 19 may drop abruptly to the low level, or may follow a prescribed function that controls the transfer function of the pixel. The waveform of the voltage signal, $V_R(t)$, applied at the gate of the reset transistor 19 and the voltage signal $V_{29}(t)$ from the voltage generated by reset voltage generator 290 and applied to reset node 29 are shown by the voltage timing diagram of FIG. 3. For simplicity, the voltage $V_R(t)$ is shown to return to a low level abruptly at times D and J.

As stated previously, the voltage $V_R(t)$ may follow a prescribed function for the control of the pixel transfer function. The period, immediately following the soft reset until the initiation of the next reset, is referred to as an integration period. During the integration period, the photo current is integrated on the sense capacitor 13, causing the pixel voltage to descend. The rate of descent is proportional to the incident light intensity.

Therefore, by measuring the voltage at the sense node at reset and at the end of the integration period and then determining the voltage difference, the light intensity incident upon the pixel can be measured through the determined voltage difference.

The reset level can be measured at either time C or time E and the integrated value can be measured at time F, a short time before the initiation of the next reset at time G. In most CMOS imagers, the reset value corresponding to the next frame, at time I or K, is measured instead of the value, at time C or E, in order to minimize the hardware complexity.

Figure 4:
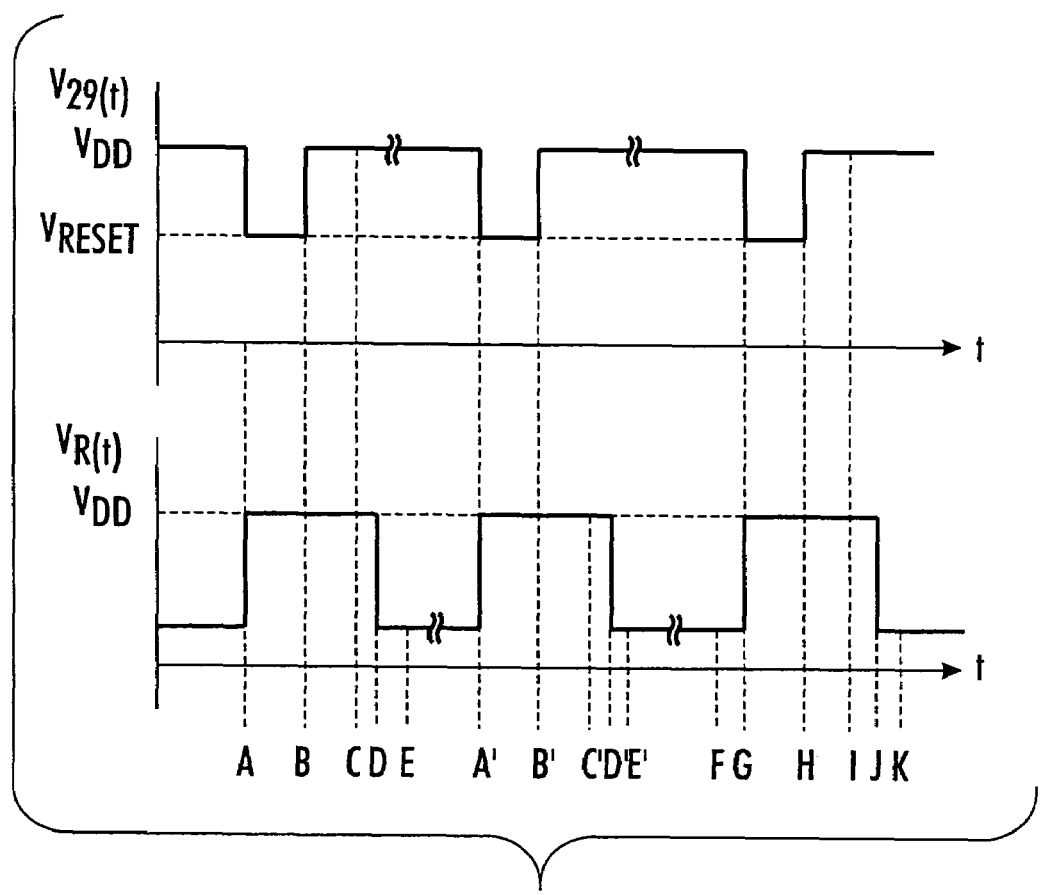

When a shorter integration period is desired, another reset period can be inserted as shown in FIG. 4. The hard-soft reset is initiated again at time A', effectively shortening the integration period. The pixel values are measured at time F and I or K if the is design to measure the reset value at the beginning the next frame (or C or E if the process is designed to measure the reset value at the beginning of an integration period), as before.

In a typical imager, a number of pixels are arranged in row and columns. For example, in a VGA imager, over 300,000 pixels are arranged in approximately 480 rows and 640 columns. Typically, a signal processing circuit that includes a double sampling circuit is provided for each column. The timing of signals for different rows is typically staggered in order to share the processing circuits among the pixels in a column.

For example, if one of the rows is provided with voltage timing diagram, as shown in FIG. 4, the next row downstream receives a copy of the same signal shifted by a fixed amount of time $T_{ROW}$ referred to as 'row time'. Each adjacent row's timing is shifted by $T_{ROW}$.

Figure 3:
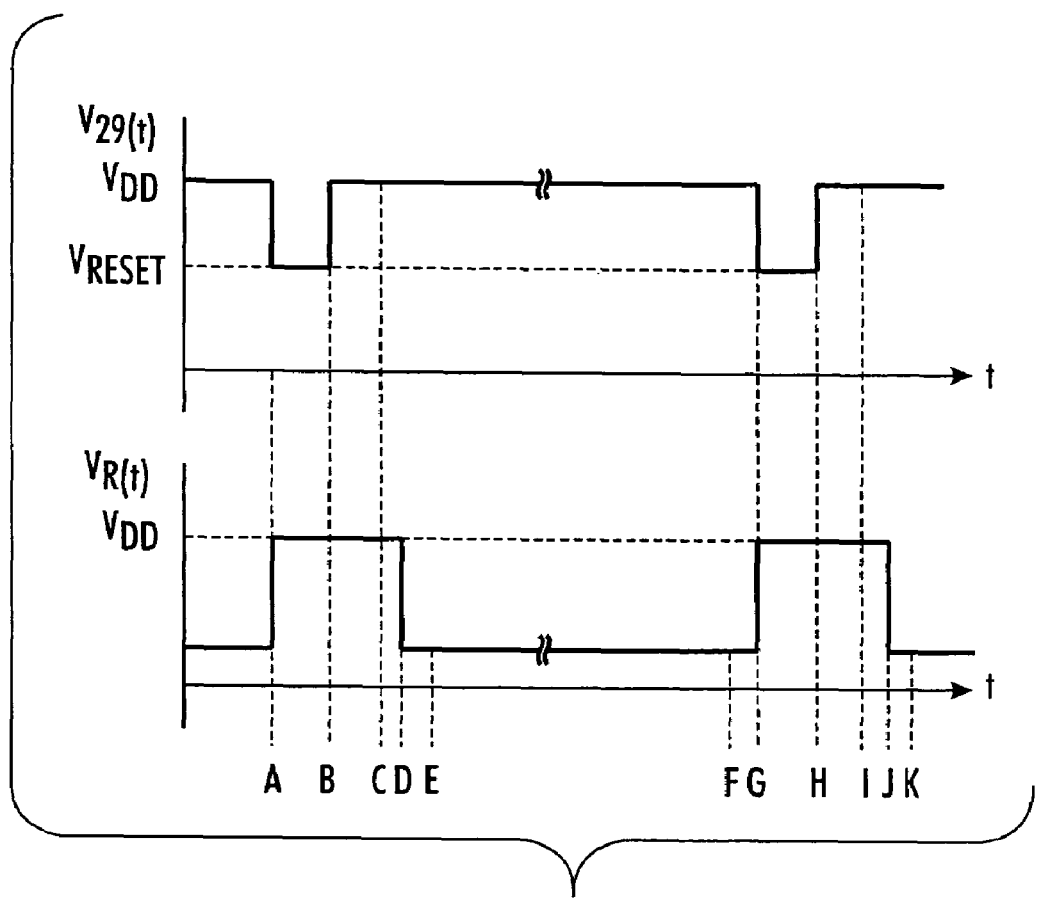
FIGS. 3 and 4 are timing diagrams for reset signals used to reset a pixel in accordance with the concepts of present invention.

There are several options with respect to the electrical connection of the reset node 29 to the reset voltage generator 290 among pixels in the imaging array. One option is to tie together all the reset nodes row-wise. In other words, all the reset nodes 29 in a row are electrically connected together and there is only a single connection per row to the reset voltage generator 290. The voltage signal as shown in FIG. 3 or 4 is applied to each row.

Figure 5:
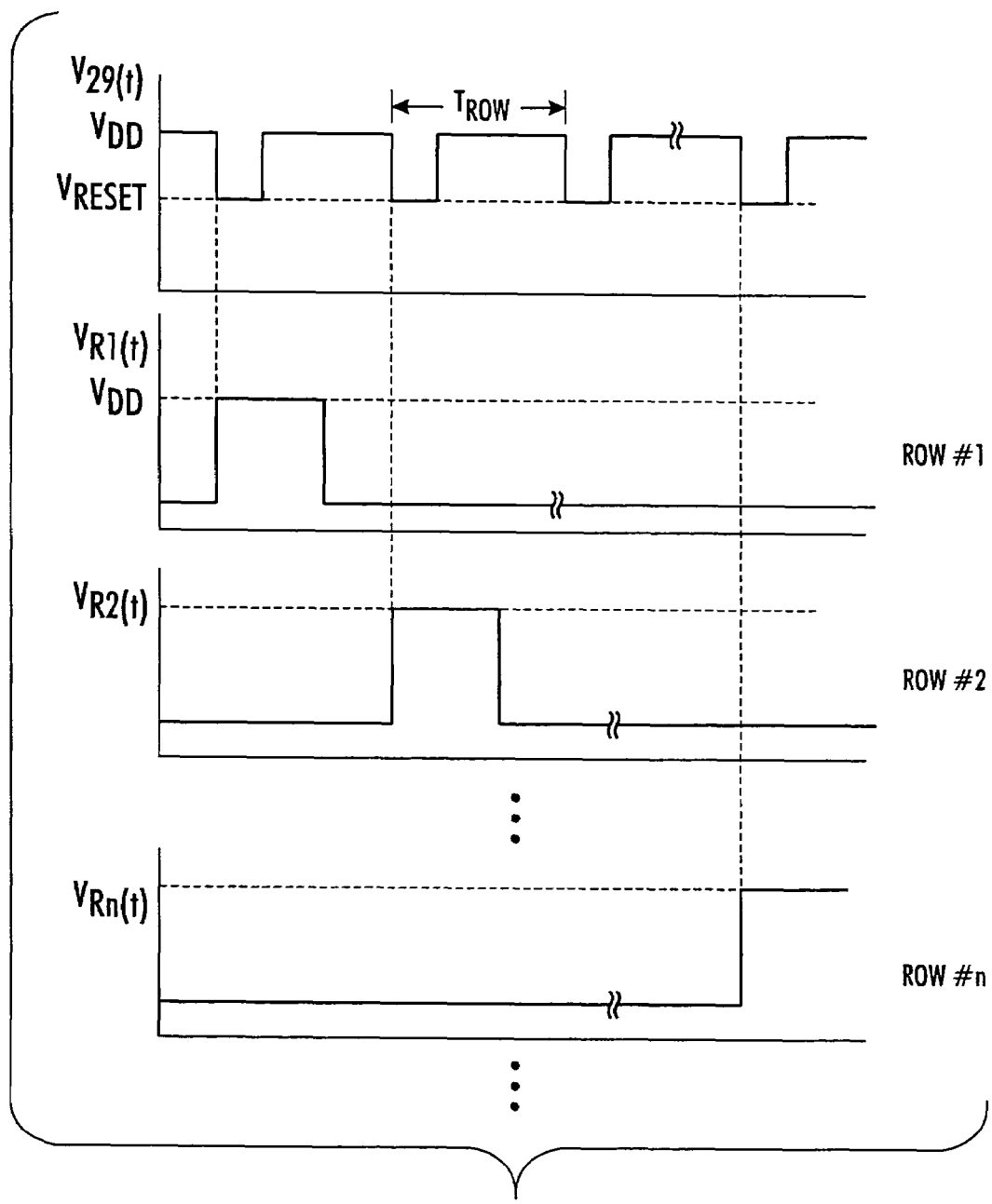
FIG. 5 is a timing diagram for reset signals used to reset multiple rows of pixels in accordance with the concepts of present invention

Another option is to electrically connect the reset node 29 of all pixels together. In this case, the voltage waveform $V_{29}(t)$ from the reset voltage generator 290, as shown in FIG. 5, is applied to all pixels simultaneously. In other words, all the reset nodes 29 in the imaging array are electrically connected together and there is only a single connection to the reset voltage generator 290. The voltage is $V_{29}(t)$ dips to $V_{RESET}$ at the period of the row time $T_{ROW}$ in order to provide hard reset at the beginning of the reset for every row.

A third option is to tie the reset nodes column-wise, and apply the same voltage waveform $V_{29}(t)$ from the reset voltage generator 290, as shown in FIG. 5. In other words, all the reset nodes 29 in a column are electrically connected together and there is only a single connection per column to the reset voltage generator 290.

Figure 6:
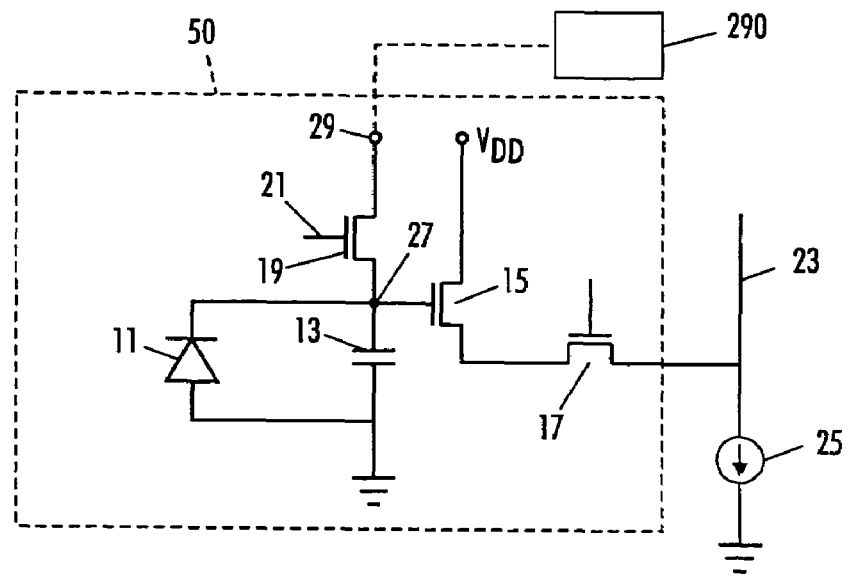
FIG. 6 is a schematic diagram of another embodiment of a pixel circuit in accordance with the concepts of present invention

Referring to FIG. 6, the operation of pixel 50 of another embodiment according to the concepts of the present invention is described; This embodiment of the present invention is identical in operation to the embodiment described above with respect to FIG. 2, but the drain of the reset transistor 19 is electrically separated from the drain of the source-follower transistor 15 and connected directly to the reset voltage generator 290 through the reset node 29, as shown in FIG. 6.

In this embodiment, the drain of the source-follower transistor 15 is directly connected to the power supply voltage, typically $V_{DD}$, while reset node 29 (connected to the drain of the reset transistor 19) is operatively connected to the reset voltage generator 290 and receives the voltage signal waveform shown in FIGS. 3, 4, or 5 depending on the configuration. The separation of drain of transistors 15 and 19 reduces possible feedthrough effects from the drain of the transistor 15 to the sense node 27. Each of the reset nodes 29 of the pixels in the imaging array can be tied together, tied together row-wise, or tied together column-wise, as described above.

Figure 7:
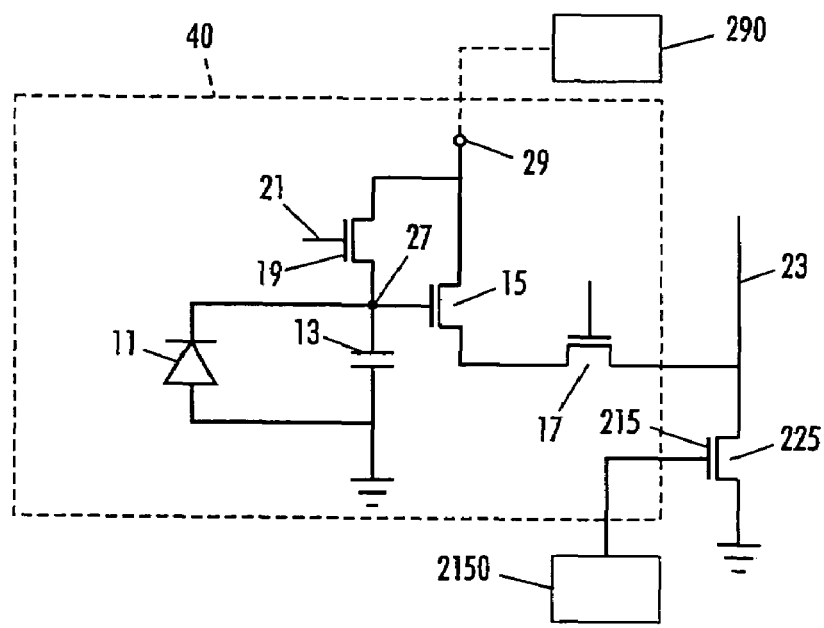
FIG. 7 is a schematic diagram of one embodiment of a column sense circuit in accordance with the concepts of present invention.

A further embodiment of the concepts of the present invention applies the principle of a hard reset followed by a soft reset to the column line. This embodiment, as illustrated in FIG. 7, includes a pixel 40 similar to the pixel illustrated in FIG. 2. However, any active pixel design can be employed.

A transistor 225 replaces the column current source of prior art imagers. Before each measurement of the reset value and the integrated value, for example at times F and K respectively in FIG. 4, the column line 23 is 'hard reset' to a predetermined voltage, preferably ground, by raising the voltage at the gate 215 of the transistor 225 by applying a bias voltage generated by the column reset voltage generator 2150.

Upon completion of the hard reset, the gate 215 of the transistor 225 is lowered to, preferably, ground, by applying an appropriate voltage generated by the column reset voltage generator 2150, in order to turn transistor 225 OFF and the row select transistor 17 is turned ON. This allows the column line 23 to be 'soft reset' to a voltage approximately equal to the sense node voltage $V_{27}$ minus the threshold voltage of the transistor 15.

$$V_{23}=V_{27}-V_{TH15}$$

The column line voltages that are 'hard/soft reset' in this fashion are measured at two different times, for example F and K in FIG. 4, in order to capture the values corresponding to reset and integration, and the differences between these two values are taken as an output. This output voltage is simply the difference between the sense node voltage $V_{27}$ at times F and K, because the threshold voltage $V_{TH15}$ cancels out when the difference in the column line voltage $V_{23}$ at two different times is taken as the output.

Figure 8:
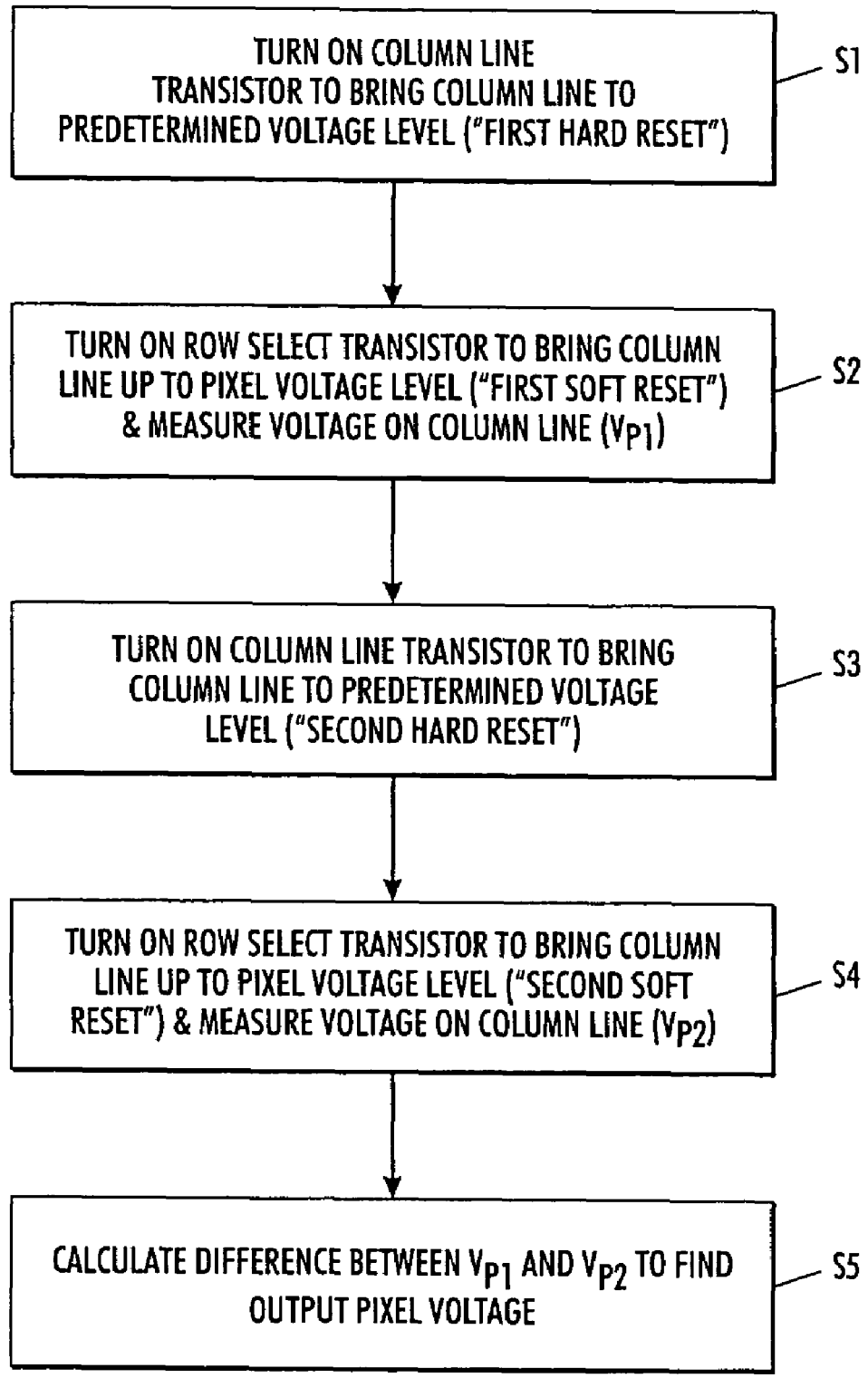
FIG. 8 is a flowchart illustrating source-follower column line reset according to the concepts of the present invention.

FIG. 8 provides a flowchart illustrating the process described above with respect to FIG. 7. As illustrated in FIG. 8, at step S1, the present invention turns ON the column line transistor to bring the column line to a predetermined voltage level. In other words, step S1 provides the first hard reset of the column line. At step S2, the present invention turns ON the row select transistor to bring column line up to the pixel voltage level. The bringing up of the column line voltage to the pixel voltage level is the first soft reset. Thereafter, the voltage $V_{P1}$ on the column line is measured to capture the voltage value corresponding to reset.

At step S3, at the completion of the integration period, the present invention turns ON the column line transistor again to bring the column line to a predetermined voltage level. In other words, step S3 provides the second hard reset of the column line. At step S4, the present invention turns ON the row select transistor to bring column line up to the pixel voltage level. The bringing up of the column line voltage to the pixel voltage level is the second soft reset. Thereafter, the voltage $V_{P2}$ on the column line is measured to capture the voltage value corresponding to integration.

At Step S5, the differences between the reset voltage $V_{P1}$ and the integration voltage $V_{P2}$ is determined and received as the output voltage for that pixel.

In summary, the present invention provides a hard reset and a soft reset of the column line prior to each column line reading to collect the reset and integrated voltages. It is noted that the order of the resets described above can be changed depending on the designed reading routine. More specifically, the integrated voltage could be read before the reset voltage and the difference taken to realize the pixel output. In this example, an integrated voltage is taken at the end of an integration period and the reset voltage is taken at the beginning of the next integration period to provide the two voltage values.

Therefore, accurate measurements of the sense node voltages in response to incident light can be realized. Compared with the designs in FIGS. 1, 2, and 6 where the column line 23 is provided with a constant current source, this embodiment reduces power consumption because the transistor 225 is turned ON for only a short period of time. The other advantage is that the voltage drop between the sense node 27 and the column line 23 is only $V_{TH15}$, compared with $V_{GS15}+V_{DS17}$ in imagers with a constant column current source. Such reduction in the voltage drop provides larger pixel-voltage range improving the dynamic range and signal-to-noise ratio of the imager.

It is noted that the above description relating to column line resetting is also applicable to row line resetting if the imager is configured to read out the data from the pixels in a row fashion as opposed to a column fashion.

More specifically, the present invention, in this embodiment, turns ON the row line transistor to bring the row line to a predetermined voltage level; turns ON a column select transistor associated with the pixel and turning OFF row line transistor to bring the row line voltage up to a pixel voltage level; captures a first voltage value on the row line; turns ON the row line transistor to bring the row line to a predetermined voltage level; turns ON a column select transistor associated with the pixel and turning OFF row line transistor to bring the row line voltage up to a pixel voltage level; captures a second voltage value on the row line; and determines a difference between the first and second captured voltage values, the difference being the measured pixel voltage.

In conclusion, the present invention provides hard and soft resets to provide accurate measurements of the pixel voltage as well as to reduce power consumption. The multiple resets improve the dynamic range and signal-to-noise ratio of the imager. Lastly, the present invention, as described above in its various embodiments, significantly reduces reset noise and substantially eliminates image lag.

While various examples and embodiments of the present invention have been shown and described, it will be appreciated by those skilled in the art that the spirit and scope of the present invention are not limited to the specific description and drawings herein, but extend to various modifications and changes.

What is claimed is:

1. A circuit for a pixel site in an imaging array, comprising:
   a pixel to convert incident light to an electrical signal;
   a column line to read out a voltage from said pixel;
   a column line transistor, operatively connected between one end of said column line and a predetermined voltage, to hard reset a voltage associated with said column line; and
   a reset voltage generator, operatively connected to said column line transistor, to generate column line reset pulses;
   said reset voltage generator is configured to generate a first reset pulse before a beginning of an integration period of said pixel;
   said reset voltage generator is configured to generate a second reset pulse after generating said first reset pulse, the generation of the second reset pulse being at an end of the integration period of said pixel.

2. The circuit as claimed in claim 1, wherein said pixel comprising:
   a light-detecting element to convert incident light to a photocurrent;
   a reset transistor, operatively connected to said light-detecting element, to reset a voltage associated with said light-detecting element; and
   a pixel reset voltage generator, operatively connected to a non-gate terminal of said reset transistor, to generate a reset voltage;
   said pixel reset voltage generator is configured to generate a first pixel reset voltage;
   said pixel reset voltage generator is configured to generate a second pixel reset voltage after generating said first pixel reset voltage.

3. The circuit as claimed in claim 1, wherein said predetermined voltage is ground.

4. The circuit as claimed in claim 2, wherein said pixel further comprising:
   a transistor; said transistor having a gate thereof operatively connected to said light-detecting element;
   said transistor having a non-gate terminal thereof operatively connected to said pixel reset voltage generator.

5. The circuit as claimed in claim 2, wherein said pixel further comprising:
   a transistor;
   said transistor having a gate thereof operatively connected to said light-detecting element;
   said transistor having a non-gate terminal thereof operatively connected to a voltage source.

6. The circuit as claimed in claim 2, wherein said first pixel reset voltage has a value to drive said reset transistor to operate in a triode region.

7. A method for measuring a pixel voltage using a column line, comprising:
   (a) hard resetting the column line voltage to a first predetermined voltage;
   (b) soft resetting the column line voltage to a first pixel voltage;
   (c) hard resetting the column line voltage to a second predetermined voltage;
   (d) soft resetting the column line voltage to a second pixel; and
   (e) determining a difference between the first and second pixel voltages, the difference being the measured pixel voltage.

8. The method as claimed in claim 7, wherein the first predetermined voltage is equal to the second predetermined voltage.

9. The method as claimed in claim 7, wherein the first predetermined voltage is ground.

10. The method as claimed in claim 7, wherein the second predetermined voltage is ground.

11. The method as claimed in claim 7, wherein the first and second predetermined voltages are ground.

12. The method as claimed in claim 7, wherein the first pixel voltage is a pixel reset voltage and the second pixel voltage is a pixel integrated voltage.

13. The method as claimed in claim 7, wherein the second pixel voltage is a pixel reset voltage and the first pixel voltage is a pixel integrated voltage.

14. The method as claimed in claim 7, further comprising:
   (f) generating a hard reset of a voltage associated with a light-detecting element of the pixel to reset the voltage associated with the light-detecting element; and
   (g) generating a soft reset of the voltage associated with the light-detecting element, after generating the hard reset, to reset the voltage associated with the light-detecting element.

15. A method for measuring a pixel voltage using a column line, the column line including a column line transistor, comprising:
   (a) turning ON the column line transistor to bring the column line to a first predetermined voltage level;
   (b) turning ON a row select transistor associated with the pixel and turning OFF column line transistor to bring the column line voltage up to a pixel voltage level;
   (c) capturing a first voltage value on the column line; (d) turning ON the column line transistor to bring the column line to a second predetermined voltage level;
   (e) turning ON a row select transistor associated with the pixel and turning OFF column line transistor to bring the column line voltage up to a pixel voltage level;
   (f) capturing a second voltage value on the column line; and
   (g) determining a difference between the first and second captured voltage values, the difference being the measured pixel voltage.

16. The method as claimed in claim 15, wherein the first predetermined voltage is equal to the second predetermined voltage.

17. The method as claimed in claim 15, wherein the first predetermined voltage is ground.

18. The method as claimed in claim 15, wherein the second predetermined voltage is ground.

19. The method as claimed in claim 15, wherein the first and second predetermined voltages are ground.

20. The method as claimed in claim 15, wherein the first voltage value is a pixel reset voltage and the second voltage value is a pixel integrated voltage.

21. The method as claimed in claim 15, wherein the second voltage value is a pixel reset voltage and the first voltage value is a pixel integrated voltage.

* * * * *